(12) United States Patent
Prasad

(10) Patent No.: US 8,795,395 B2
(45) Date of Patent: Aug. 5, 2014

(54) STRUCTURALLY MODIFIED LIGNITE WITH OR WITHOUT EXTRACTION OF FUNCTIONALLY ENHANCED ORGANIC MOLECULES

(75) Inventor: Durga Yandapalli Prasad, Andhra Pradesh (IN)

(73) Assignee: Bijam Biosciences Private Limited, Hyderabad (IN)

( * ) Notice: Subject to any disclaimer, the term of this patent is extended or adjusted under 35 U.S.C. 154(b) by 1402 days.

(21) Appl. No.: 12/312,550

(22) PCT Filed: Nov. 15, 2007

(86) PCT No.: PCT/IB2007/003501
§ 371 (c)(1),
(2), (4) Date: Nov. 18, 2009

(87) PCT Pub. No.: WO2008/059358
PCT Pub. Date: May 22, 2008

(65) Prior Publication Data
US 2010/0077816 A1    Apr. 1, 2010

Related U.S. Application Data

(60) Provisional application No. 60/865,985, filed on Nov. 15, 2006.

(51) Int. Cl.
*C05F 11/02*    (2006.01)
*C10L 5/00*    (2006.01)

(52) U.S. Cl.
USPC ..................................... 44/608; 71/23; 71/24

(58) Field of Classification Search
USPC .................................... 71/11, 23, 24; 44/608
See application file for complete search history.

(56) References Cited

U.S. PATENT DOCUMENTS 4,013,440 A    3/1977  Vale
(Continued)

FOREIGN PATENT DOCUMENTS

AU    509 782 B2    5/1980
FR    1 140 910      8/1957
(Continued)

OTHER PUBLICATIONS

Standard operating procedure-hydrogen peroxide, University of Michigan Jul. 28, 200.*

(Continued)

*Primary Examiner* — Wayne Langel
*Assistant Examiner* — Syed Iqbal
(74) *Attorney, Agent, or Firm* — Foley & Lardner LLP

(57) ABSTRACT

A structurally modified lignite composition with or without having functionally enhanced organic molecules extracted there-from, said functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof.

2 Claims, 7 Drawing Sheets

(56) References Cited

U.S. PATENT DOCUMENTS

| | | | |
|---|---|---|---|
| 5,026,416 | A | 6/1991 | Alexander |
| 5,034,045 | A | 7/1991 | Alexander |
| 5,084,160 | A | 1/1992 | Stewart et al. |
| 5,248,814 | A | 9/1993 | Calemma et al. |
| 5,415,778 | A | 5/1995 | Zanin et al. |
| 5,688,999 | A | 11/1997 | Lebo, Jr. et al. |
| 6,695,892 | B1 | 2/2004 | Fischer et al. |
| 7,198,805 | B2 | 4/2007 | Gladkov et al. |

FOREIGN PATENT DOCUMENTS

| | | | |
|---|---|---|---|
| WO | WO 87/02355 A1 | | 4/1987 |
| WO | WO 8702355 A1 * | | 4/1987 |
| WO | WO 2004/101435 A1 | | 11/2004 |
| WO | WO 2006/000073 A1 | | 1/2006 |
| WO | WO 2008/053339 A2 | | 5/2008 |

OTHER PUBLICATIONS

International Search Report received in International application No. PCT/IB2007/003501.

Mae, Kazuhiro et al., "Extraction of Low-Rank Coals Oxidized with Hydrogen Peroxide in Conventionally Used Solvents at Room Temperature", Energy &Fuels, 1997, vol. 11, No. 4, pp. 825-831.

Miura, Kouichi et al., "New Oxidative Degradation Method for Producing Fatty Acids in High Yields and High Selectivity from Low-Rank Coals", Energy & Fuels, 1996, vol. 10, No. 6, pp. 1196-1201.

Peiris, Damayanthi et al., "The Use of Ca-modified, Brown-Coal-Derived Humates and Fulvates for Treatment of Soil Acidity", Australian Journal of Soil Research, 2002, vol. 40, pp. 1171-1186.

Schmidt, K. et al., "Nitrogen-bonded Aromatics in Soil Organic Matter and their Implications for a Yield Decline in Intensive Rice Cropping", PNAS, 2004, vol. 101, No. 17, pp. 6351-6354.

Wang, X. J. et al., "The Effect of Humic Acids on the Availability of Phosphorus Fertilizers in Alkaline Soils", Soil Use and Management, 1995, vol. 11, pp. 99-102.

* cited by examiner

SEQUENTIAL ENHANCEMENT OF FUNCTIONAL GROUPS OF LIGNITE WITH STEP-WISE PERIODICAL REACTION WITH HYDROGEN PEROXIDE $^{13}$C NMR SPECTRA OF LIGNITE SAMPLE

13C NMR SPECTRA OF ORGANIC MOLECULES EXTRACTED FROM LIGNITE

US 8,795,395 B2

STRUCTURALLY MODIFIED LIGNITE WITH OR WITHOUT EXTRACTION OF FUNCTIONALLY ENHANCED ORGANIC MOLECULES

FIELD OF THE INVENTION

The present invention generally relates to the field of plant growth nutrient composition. Particularly, the present invention provides a plant growth enhancing nutrient composition that is derived from low value fossil fuel.

BACKGROUND AND PRIOR ART DESCRIPTION

Lignite is a fossil fuel which is derivative of fossilized vegetation which was lied down in the carboniferous period for millions of years ago. Over the ages, the vegetation underwent compaction and heating. Brown lignite is an intermediary product of this decomposition before becoming black coal.

As such, lignite is considered to be a low calorific value fuel. However, because of its vegetative origin this material is very rich and beneficial to plants today. It will be therefore, more beneficial to use the lignite Normally, lignite type materials are used by reacting with alkali with or without heating prior to addition of alkali (U.S. Pat. Nos. 7,198,805, 5,248,814, 5,688,999, 6,695,892).

Fulvic acids are known to haven many useful properties in the field of medicine. Humic acids and fulvic acids which are considered to be very important for plant health can be derived from lignite and present research work is aimed to produce plant nutrition product from lignite. Although some attempts were done in this direction but cost effective and integrated processes for effective conversion of lignite to utilizable plant nutrition products was not done.

Fishcer et al., U.S. Pat. No. 6,695,892 describes a process for production of organic fertilizer by heating and ammoniating treatment of lignite. This described procedure involves heating and treatment with aqueous ammonical medium.

William Alexander [U.S. Pat. Nos. 5,034,045 and 5,026,416] describes water-soluble alkali metal salt of humic acid (for example, liquid potassium humate salt) which can be used in itself to increase agricultural and horticultural crop yield. Further, the aforesaid document states as follows:

"In accordance with an important feature of the present invention, an alkali metal humate salt solution made according to the method of Example 1 can be mixed with a plant nutrient component, including such plant nutrients as nitrogen and/or phosphorous and/or potassium, to improve the yield of agricultural and horticultural crops."

In order to derive the water soluble alkali metal humate salt solution, the document teaches dispersing ground leonardite in a solution comprising water, potassium hydroxide and aqueous hydrogen peroxide. More particularly, Alexander describes the treating of the alkali metal with leonardite. The derivative of the invention primarily derived by reacting with potassium hydroxide with small amount of addition of hydrogen peroxide in alkaline conditions, so that as explained in these patents to achieve the full advantage of the present condition. According to Alexander, when the humic acid bearing leonardite ore is treated with alkali hydroxide, oxidized sites of humic acid are saturated with readily ion-exchangeable non volatile alkali metal ions, such as potassium ions. Thus, it can be noticed that the product of Alexander is primarily derived by reacting with potassium hydroxide. The reaction condition has been maintained as alkaline so as to enable derivation of an alkali metal salt mainly aiming for cation exchange capacity.

Although there are attempts to produce lower molecular weight compounds from leonardite by using microbial conversion process [U.S. Pat. No. 5,084,160] using Coriolus versicolor and digesting with other microorganisms [wo20006000073] these inventions are costly methods to produce in ton scale and are not much practical to use for agricultural and other purposes.

Thus, there is a need to produce lignite based plant nutrition product with efficiency and economics which is different from the previous cited documents. Also, there exists a need to effectively convert non-nutritionally active constituents present in lignite to more active form thus enabling large scale production of lignite based fertilizers so that these lignite based fertilizers can act as a viable solution to fill the gaps of the present fertilization practices with better integration and sustainability.

OBJECTS OF THE INVENTION

Therefore one of the objects of the present invention is to provide functionally effective organic molecules derived from lignite. More particularly, to provide structurally modified lignite composition with or without having functionally enhanced organic molecules extracted there-from and water soluble substance comprising functionally enhanced organic molecules.

One more object of the present invention is to provide a viable method for production of such structurally modified lignite composition and water soluble substance and to provide industrial application of such structurally modified lignite composition and water soluble substance.

Another object of the present invention is to provide plant nutrition product for enhancement of quantity and quality of plant products along with improvement, in soil health.

Yet another object of the present invention is to provide a viable method for production of lignite based plant nutrition product and use of such lignite based plant nutrition product for effective and integrated plant nutrition.

SUMMARY OF THE INVENTION

The Inventor has derived organic molecules from lignite by hydrogen peroxide reaction under acidic conditions, which renders the organic molecules thus derived suitable for use in any form either by foliar, or for addition to any other substances such as fertilizers and/or pesticides. Further more the present invention also imparts desirable qualities in the organic molecules thus derived from lignite by cleaving and/or incorporating or enhancing one or more of functional groups selected from the carbonyl, carboxyl, amidic, ester, phenolic, alcoholic, ketone and aldehyde groups. In one embodiment of the present invention, the organic molecules which have been cleaved and/or contain enhanced number of one or more of functional groups selected from the carbonyl, carboxyl, amidic, ester, phenolic, alcoholic, ketone and aldehyde groups are kept in tact with lignite. The enhancement of the functional group(s) in the organic molecules is clearly depicted by the FTIR analysis conducted, results of which are provided by sequentially reacting the lignite with hydrogen peroxide.

In the present invention, organic molecules have been developed which have more functional freedom in structural and functional aspects of biological reactions as these organic molecules are not filled or saturated with alkali such as potassium.

The inventor have for the first time established that all types of organic molecules obtained from processing of lignite are not suitable to mix with all types of plant nutrient. It has been found that only certain categories of organic molecules obtained from the processing of lignite are capable of acting as a plant growth enhancing nutrient composition selectively. Furthermore, the Inventor has observed that same type of organic molecules obtained from processing of lignite when mixed with two different classes of conventional plant nutrients i.e. nitrogenous fertilizers and phosphate fertilizers do not essentially act in a similar manner and provide plant growth enhancing property. It has been found that only certain combinations of conventional plant nutrients such as nitrogenous fertilizers and phosphate fertilizers and organic molecules obtained from the processing of lignite are capable of acting as a plant growth enhancing nutrient composition. Once the required organic compounds are extracted after processing of lignite, a huge amount of solid mass is left behind, if it is not utilized, the same may act as environment hazard. Hence, the Inventor has also identified a way of utilizing the solid mass to produce value added products.

BRIEF DESCRIPTION OF THE INVENTION

Accordingly, the present invention provides structurally modified lignite composition with or without having functionally enhanced organic molecules extracted there-from, said functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof.

The present invention also provides a process for preparing structurally modified lignite composition with or without having functionally enhanced organic molecules extracted there-from, said process comprising a step of reacting pulverized lignite at least once with hydrogen peroxide under acidic conditions so as to effect cleaving thereby producing the functionally enhanced organic molecules and optionally extracting there-from a water soluble substance comprising functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (1) below 500, (ii) between 500 and 1000, (iii) between 1000 and 5000, (iv) equal to or greater than 5000 and (v) a combination of utmost of any of the three of (i), (ii), (iii) and (iv) thereof.

The present invention further provides a process of enhancing plant growth, said process comprising the step of contacting the plant and/or soil with an effective amount of a structurally modified lignite composition with or without having functionally enhanced organic molecules extracted there-from, said functionally enhanced organic molecules having enhanced or reduced number of one or more of functional groups selected: from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof.

The present invention provides a water soluble substance comprising functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof.

The present invention further provides a process for preparing a water soluble substance comprising functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof, said process comprising a step of reacting pulverized lignite at least once with hydrogen peroxide under acidic conditions so as to effect cleaving thereby obtaining a reaction mixture comprising functionally enhanced organic molecules and extracting the water soluble substance comprising functionally enhanced organic molecules either in the form of liquid or solid from the reaction mixture by separation technique.

The present invention also provides process of enhancing plant growth, said process comprising the step of contacting the plant and/or soil with an effective amount of a water soluble substance comprising functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof.

The present invention provides a plant growth enhancing nutrient composition providing slow and/or controlled release and effective availability and/or assimilation of nutrient, said composition comprising:

a structurally modified lignite composition with or without having functionally enhanced organic molecules extracted there-from, said functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof; or a water soluble substance comprising functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof;

and optionally, one or more synthetic and/or natural nutrient;

wherein if the plant growth enhancing nutrient composition comprises the synthetic and/or natural nutrient, the weight ratio of the structurally modified lignite composition or the water soluble substance to the synthetic and/or natural nutrient is in the range of 0.01:1 to 10:1.

The present invention further provides a process for preparing a plant growth enhancing nutrient composition, said method comprising the steps of:

(a) preparing structurally modified lignite composition with or without having functionally enhanced organic molecules extracted there-from, said functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof; or (b) preparing a water soluble substance comprising functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof; and optionally (c) mixing or reacting one or more synthetic and/or natural nutrient with either of the structurally modified lignite composition thus obtained in step (a) or the water soluble substance thus obtained in step (b) such that if the plant growth enhancing nutrient composition comprises the synthetic and/or natural nutrient, the weight ratio of the structurally modified lignite composition or the water soluble substance to the synthetic and/or natural nutrient is in the range of 0.01:1 to 10:1.

The present invention also provides a process of enhancing plant growth, said process comprising the step of contacting the plant and/or soil with an effective amount of a plant growth enhancing nutrient composition comprising:

a structurally modified lignite composition with or without having functionally enhanced organic molecules extracted there-from, said functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof; or a water soluble substance comprising functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof;

and optionally one or more synthetic and/or natural nutrient;

wherein if the plant growth enhancing nutrient composition comprises the synthetic and/or natural nutrient, the weight ratio of the structurally modified lignite composition or the water soluble substance to the synthetic and/or natural nutrient is in the range of 0.01:1 to 10:1.

In an embodiment of the present invention, the plant growth enhancing nutrient composition comprises:

a water soluble substance comprising functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof; and one or more synthetic and/or natural nutrient;

wherein the weight ratio of the water soluble substance to the synthetic and/or natural nutrient is in the range of 0.01:1 to 10:1.

In another embodiment of the present invention, the process for preparing a plant growth enhancing nutrient composition comprises the steps of:

(a) preparing a water soluble substance comprising functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof; and (b) mixing or reacting one or more synthetic and/or natural nutrient with the water soluble substance thus obtained in step (a) such that the weight ratio of the water soluble substance to the synthetic and/or natural nutrient is in the range of 0.01:1 to 10:1.

In yet another embodiment of the present the process of enhancing plant growth comprises the step of contacting the plant and/or soil with an effective amount of a plant growth enhancing nutrient composition comprising:

a water soluble substance comprising functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof; and one or more synthetic and/or natural nutrient;

wherein the weight ratio of the water soluble substance to the synthetic and/or natural nutrient is in the range of 0.01:1 to 10:1.

In still another embodiment of the present invention, the plant growth enhancing nutrient composition comprises:

a structurally modified lignite composition with or without having functionally enhanced organic molecules extracted there-from, said functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof; and one or more synthetic and/or natural nutrient;

wherein the weight ratio of the structurally modified lignite composition to the synthetic and/or natural nutrient is in the range of 0.01:1 to 10:1.

In one more embodiment of the present invention, the process for preparing a plant growth enhancing nutrient composition comprises the steps of:

(a) preparing structurally modified lignite composition with or without having functionally enhanced organic molecules extracted there-from, said functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof;

(b) mixing or reacting one or more synthetic and/or natural nutrient with either of the structurally modified lignite composition thus obtained in step a such that the weight ratio of the structurally modified lignite composition to the synthetic and/or natural nutrient is in the range of 0.01:1 to 10:1.

In one another embodiment of the present invention, the process of enhancing plant growth comprises the step of contacting the plant and/or soil with an effective amount of a plant growth enhancing nutrient composition comprising:

a structurally modified lignite composition with or without having functionally enhanced organic molecules extracted there-from, said functionally enhanced organic molecules having enhanced or reduced number of one or more of functional groups selected from a group comprising of carbonyl, carboxyl, amidic, ester, phenolic, alcoholic, ketone and aldehyde groups and having molecular weight selected from a group comprising of (i) below 500, (ii) between 500 and 1000, (iii) between 1000 and 5000, (iv) equal to or greater than 5000 and (v) a combination of utmost of any of the three of (i), (ii), (iii) and (iv) thereof; and one or more synthetic and/or natural nutrient;

wherein the weight ratio of the structurally modified lignite composition to the synthetic and/or natural nutrient is in the range of 0.01:1 to 10:1.

In a further embodiment of the present invention, the plant growth enhancing nutrient composition comprises at least one water soluble substance consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight below about 1000, said water soluble substance being obtained by cleaving of lignite.

In a further more embodiment of the present invention, the process for preparing water soluble substance comprises the steps of:

(a) cooling hydrogen peroxide to a temperature in the range of about −5 to −20° C.;

(b) adding water to lignite in a ratio of 1:1 to 3:1 (v/w);

(c) adding 5 to 50% of cold hydrogen peroxide to the lignite thus obtained in step (b) in a ratio of 1:1 to 1:5 (v/w);

(d) allowing the lignite to react with hydrogen peroxide for a time period in the range of about 15 minutes to about 3 hours at ambient conditions; and (e) adding hydrogen peroxide to a product thus obtained in step (d) in a ratio of 1:1 to 1:5 (v/v); and (f) repeating step (c) to (e) a predetermined number of times followed by extraction with water to obtain the water soluble substance.

In an embodiment of the present invention, the process for preparing water soluble substance comprises the steps of:

(a) cooling hydrogen peroxide to a temperature below about −5 to −20° C.;

(b) adding lignite to the cold hydrogen peroxide thus obtained in step (a), the ratio of the hydrogen peroxide added to the lignite being in the range of 1:2 to 1:3 (v/w);

(c) allowing the lignite to react with 5 to 50% hydrogen peroxide for a time period of about 1 to about 3 hour at temperature in the range of 10° to 20° C. followed by allowing the reaction to proceed for a time period of about 3 hours to 5 hours at a temperature of about 10° to 20° C.;

(d) adding hydrogen peroxide to the reaction mixture thus obtained in step (c) at ambient condition, the ratio of the hydrogen peroxide added to the reaction mixture being about 1:1 (v/w); and (e) extracting the resultant material with water and centrifuging the same so as to obtain the water soluble substance.

In another embodiment of the present invention, the water soluble substance thus obtained above has molecular weight below 1000.

In yet another embodiment of the present invention, the process for preparing water soluble substance comprises the steps of:

(a) adding lignite to hydrogen peroxide (5 to 50%) to obtain a reaction product, the ratio of the hydrogen peroxide added to the lignite being in the range of 1:1 to 1:5 (v/w); and (b) adding to the reaction product thus obtained in step (a) after drying urea like nitrogenous fertilizer to obtain functionally enhanced organic molecules having enhanced or reduced number of one or more of functional groups selected from a group comprising of carbonyl, carboxyl, amidic, ester, phenolic, alcoholic, ketone and aldehyde groups and having molecular weight above about 5000.

In one more embodiment of the present invention, the process of enhancing plant growth comprises the step of contacting the plant and/or soil with an effective amount of a plant growth enhancing nutrient composition comprising at least one water soluble substance consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight below about 1000, the water soluble substance being obtained by cleaving of lignite.

In a further embodiment of the present invention, the plant growth enhancing nutrient composition comprises structurally modified lignite composition consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight below about 1000, said functionally enhanced organic molecules being obtained by cleaving of lignite.

In a further more embodiment of the present invention, the process of enhancing plant growth comprises the step of contacting the plant and/or soil with an effective amount of a plant growth enhancing nutrient composition comprising structurally modified lignite composition consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight below about 1000, said functionally enhanced organic molecules being obtained by cleaving of lignite.

In an embodiment of the present invention, the plant growth enhancing nutrient composition comprises:
a structurally modified lignite composition consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight below about 1000, said functionally enhanced organic molecules being obtained by cleaving of lignite; and
one or more source of phosphate;
wherein the weight ratio of the structurally modified lignite composition to the said one or more source of phosphate is in the range of 0.01:1 to 10:1.

In another embodiment of the present invention, the process for preparing the plant growth enhancing nutrient composition comprises the steps of:
(a) preparing a structurally modified lignite composition consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight below about 1000 by cleaving of lignite; and
(b) adding to the structurally modified lignite composition thus obtained in step (a) one or more source of phosphate, the weight ratio of the structurally modified lignite composition to the said one or more source of phosphate being in the range of 0.01:1 to 10:1.

In yet another embodiment of the process of enhancing plant growth comprises the step of contacting the plant and/or soil with an effective amount of a plant growth enhancing nutrient composition comprising a structurally modified lignite composition consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight below about 1000, said functionally enhanced organic molecules being obtained by cleaving of lignite; and one or more source of phosphate; wherein the weight ratio of the structurally modified lignite composition to the said one or more source of phosphate is in the range of 0.01:1 to 10:1.

In one more embodiment of the present invention, the plant growth enhancing nutrient composition comprises:
water soluble substance consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight below about 1000, said water soluble substance being obtained by cleaving of lignite; and
one or more source of phosphate;
wherein the weight ratio of the water soluble substance to the said one or more source of phosphate is in the range of 0.01:1 to 10:1.

In a further embodiment of the present invention, the process for preparing the plant growth enhancing nutrient composition comprises the steps of:
(a) preparing a water soluble substance consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight below about 1000 by cleaving of lignite; and
(b) adding to the water soluble substance thus obtained in step (a) one or more source of phosphate, the weight ratio of the water soluble substance to the said one or more source of phosphate being in the range of 0.01:1 to 10:1.

In a further more embodiment of the present invention, the process of enhancing plant growth comprises the step of contacting the plant and/or soil with an effective amount of a plant growth enhancing nutrient composition comprising water soluble substance consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight below about 1000, said water soluble substance being obtained by cleaving of lignite; and one or more source of phosphate; wherein the weight ratio of the water soluble substance to the said one or more source of phosphate is in the range of 0.01:1 to 10:1.

In an embodiment of the present invention, the plant growth enhancing nutrient composition comprises at least one water soluble substance consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight above about 5000, said water soluble substance being obtained by cleaving of lignite.

In another embodiment of the present invention, the process for preparing a plant growth enhancing nutrient composition comprises the steps of
(a) adding lignite to hydrogen peroxide to obtain a reaction product, the ratio of the hydrogen peroxide added to the lignite being in the range of 1:1 to 1:5 (v/w); and
(b) adding to the reaction product thus obtained in step (a) after drying urea like nitrogenous fertilizer to obtain functionally enhanced organic molecules having enhanced or reduced number of one or more of functional groups selected from a group comprising of carbonyl, carboxyl, amidic, ester, phenolic, alcoholic, ketone and aldehyde groups and having molecular weight above about 5000.

In yet another embodiment of the present invention, the process of enhancing plant growth comprises the step of contacting the plant and/or soil with an effective amount of a plant growth enhancing nutrient composition comprising at least one water soluble substance consisting of organic molecules having enhanced or reduced number of one or more of functional groups selected from a group comprising of carbonyl, carboxyl, amidic, ester, phenolic, alcoholic, ketone and aldehyde groups and having molecular weight above about 5000, said water soluble substance being obtained by cleaving of lignite.

In still another embodiment of the present invention, the plant growth enhancing nutrient composition comprises structurally modified lignite composition consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight above about 5000, said functionally enhanced organic molecules being obtained by cleaving of lignite.

In one more embodiment of the present invention, the process of enhancing plant growth comprises the step of contacting the plant and/or soil with an effective amount of a plant growth enhancing nutrient composition comprising structurally modified lignite composition consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight above about 5000, said functionally enhanced organic molecules being obtained by cleaving of lignite.

In one another embodiment of the present invention, the plant growth enhancing nutrient composition comprises:
a structurally modified lignite composition consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight above about 1000, said functionally enhanced organic molecules being obtained by cleaving of lignite; and
one or more source of nitrogen;
wherein the weight ratio of the structurally modified lignite composition to the said one or more source of nitrogen is in the range of 0.01:1 to 10:1.

In a further embodiment of the present invention, the process for preparing the plant growth enhancing nutrient composition comprises the steps of:
(a) preparing a structurally modified lignite composition consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight above about 5000 by cleaving of lignite; and
(b) adding to the structurally modified lignite composition thus obtained in step (a) one or more source of nitrogen, the weight ratio of the structurally modified lignite composition to the said one or more source of nitrogen being in the range of 0.01:1 to 10:1.

In a further more embodiment of the present invention, the process of enhancing plant growth comprises the step of contacting the plant and/or soil with an effective amount of a plant growth enhancing nutrient composition comprising a structurally modified lignite composition consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight above about 5000, said functionally enhanced organic molecules being obtained by cleaving of lignite; and one or more source of nitrogen; wherein the weight ratio of the structurally modified lignite composition to the said one or more source of nitrogen is in the range of 0.01:1 to 10:1.

In an embodiment of the present invention, the plant growth enhancing nutrient composition comprises:
water soluble substance consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight above about 5000, said water soluble substance being obtained by cleaving of lignite; and
one or more source of nitrogen;
wherein the weight ratio of the water soluble substance to the said one or more source of nitrogen is in the range of 0.01:1 to 10:1.

In another embodiment of the present invention, the process for preparing the plant growth enhancing nutrient composition comprises the steps of:
(a) preparing a water soluble substance consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight above about 5000 by cleaving of lignite; and
(b) adding to the water soluble substance thus obtained in step (a) one or more source of nitrogen, the weight ratio of the water soluble substance to the said one or more source of nitrogen being in the range of 0.01:1 to 10:1.

In yet another embodiment of the present invention, the process of enhancing plant growth comprises the step of contacting the plant and/or soil with an effective amount of a plant growth enhancing nutrient composition comprising water soluble substance consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight above about 5000, said water soluble substance being obtained by cleaving of lignite; and one or more source of nitrogen; wherein the weight ratio of the water soluble substance to the said one or more source of nitrogen is in the range of 0.01:1 to 10:1.

In one more embodiment of the present invention, the process for preparing structurally modified lignite composition comprises the steps of:
(a) cooling hydrogen peroxide to a temperature below about −5 to −20° C.;
(b) adding water to lignite in a ratio of 1:1 to 3:1 (v/w);
(c) adding cold hydrogen peroxide to the lignite thus obtained in step (b) in a ratio of 1:1 to 1:5 (v/w);
(d) allowing the lignite to react with hydrogen peroxide for a time period in the range of about 15 minutes to about 3 hours at ambient conditions; and
(e) adding hydrogen peroxide to a product thus obtained in step (d) in a ratio of 1:1 to 1:5 (v/v); and
(f) repeating step (c) to (e) a predetermined number of times to obtain the structurally modified lignite composition.

In one another embodiment of the present invention, the process for preparing structurally modified lignite composition comprises the steps of:
(a) cooling hydrogen peroxide to a temperature below about −5 to −20° C.;
(b) adding lignite to the cold hydrogen peroxide thus obtained in step (a), the ratio of the hydrogen peroxide added to the lignite being in the range of 1:2 to 1:3 (v/w);
(c) allowing the lignite to react with hydrogen peroxide for a time period of about 1 hour at temperature in the range of 10° to 15° C. followed by allowing the reaction to proceed for a time period of about 3 hours at a temperature of about 20° C.; and (d) adding hydrogen peroxide to the reaction mixture thus obtained in step (c) at ambient condition, the ratio of the hydrogen peroxide added to the reaction mixture being about 1:1 (v/w) to obtain structurally modified lignite composition.

In further embodiment of the present invention, the structurally modified lignite composition thus obtained consists of functionally enhanced organic molecules having molecular weight below 1000.

In a further more embodiment of the present invention, the structurally modified lignite composition thus obtained consists of functionally enhanced organic molecules having molecular weight below 1000.

In an embodiment of the present invention, the process for preparing functionally enhanced organic molecules comprises the steps of (a) adding lignite to hydrogen peroxide to obtain a reaction product, the ratio of the hydrogen peroxide added to the lignite being in the range of 1:1 to 1:5 (v/w); and (b) adding to the reaction product thus obtained in step (a) after drying urea like nitrogenous fertilizer to obtain functionally enhanced organic molecules consisting of functionally enhanced organic molecules having enhanced or reduced number of one or more of functional groups selected from a group comprising of carbonyl, carboxyl, amidic, ester, phenolic, alcoholic, ketone and aldehyde groups and having molecular weight above about 5000.

The present invention also provides a novel nutrient with structurally modified lignite in combination with synthetic or natural material resulting in sustained release and effective assimilation of nutrients. The novel nutrient with structurally modified lignite wherein the lignite is structurally modified by reacting with hydrogen peroxide to enhance nutritionally active constituents such as humic acids, the said composition ranging from 0.01:1 to 10:1 of lignite: hydrogen peroxide (W/v) depending on concentration of treating solution i.e. hydrogen peroxide (1 to 50%) selected nutrients using structurally modulated lignite is effected by addition of selected nutrient or nutrients, singly or combinedly in a ratio of 0.01:1 to 10:1 (W/W) of added nutrients to lignite.

It has been found that structural modulation of lignite enables more nutritionally active bonds from this modified lignite allowing designing of a plant nutrient product by mixing with selected nutrients or nutrient resulting in sustained release and with more effective assimilation.

In an embodiment of the present invention, the process of producing a nutrient with structurally modified lignite comprises the following steps:

(a) powdering the lignite material,
(b) micronization of lignite powder to required microns size,
(c) drying the micronized lignite powder for removal of excess moisture,
(d) treating the said micronized lignite powder with hydrogen peroxide for effective structural conversion,
(e) treating the said material with urea like nitrogenous fertilizer to obtain and/or phosphate fertilizer an/or potassium fertilizer and/or with phosphoric acid and/or with other aqueous solutions containing macro and/or micro nutrients,
(f) neutralizing the said reaction solution by appropriate addition of acidic, and/or alkaline nutrient solutions,
(g) structuring the resultant material into a format of tablet or pellet or granule or prill or powder or with other possible, shapes for effective use; and
(h) drying the resultant product at room temperature or with a dryer.

In an embodiment of the present invention, the enhanced nutritionally active constituents with required elements of plant nutrition can be used for soil, foliar and fertigation applications.

In another embodiment of the present invention, the micronized powder of lignite is treated with hydrogen peroxide to enhance active constituents of plant nutrition.

In yet another embodiment of the present invention, the micronized powder of lignite is treated with hydrogen peroxide and later desired nutritional enhancement with macro elements (nitrogen, phosphate and potassium) and/or with micro elements (magnesium, calcium, copper, zinc, manganese, boron, iron, silica, sulphur and molebdenum).

In still another embodiment of the present invention, the micronized powder of lignite was extracted with excess amount of hydrogen peroxide to produce soluble lignite based fertilizer suitable for foliar and fertigation requirements.

In a further embodiment of the present invention, the micronized powder of lignite is treated with hydrogen peroxide and mixed with plant nutrients and/or with micro nutrients selected from the group comprising of magnesium, calcium, copper, zinc, manganese, boron, iron, silica, sulphur and molebdenum containing solution is being mixed with molten urea and/or with existing nitrogen, phosphate, potash, micro element fertilizers and or complex fertilizers singly or combined to produce selective and/or specific plant nutrition product to enhance quantity and/or quality of plant products.

In a further more embodiment of the present invention, the lignite sample treated with hydrogen peroxide results in enhancement of active constituents as the absorbance intensity of significant increase to 1700±50 wave numbers ($cm^{-1}$).

In one more embodiment of the present invention, the hydrogen peroxide treated lignite without extraction results in characteristic FTIR peaks out of which about 12 peaks are in the range of 1600 to 1700 wave numbers ($cm^{-1}$).

The present invention further provides functionally effective organic molecules extracted from lignite, said functionally effective organic molecules being obtained by a process comprising steps of:

(a) adding lignite to hydrogen peroxide and
(b) removing soluble functionally effective organic molecules from the insoluble lignite after reaction by centrifugation or precipitation.

The functionally effective organic molecules are functionally more effective than normal organic molecules including humic and fulvic acids present in lignite due to enhanced reactive nature obtained by treating with hydrogen peroxide which are resultant of cleavage of lignite.

In an embodiment of the present invention, the hydrogen peroxide having a concentration in the range of 5-50% was added to micronized lignite, the ratio of lignite and hydrogen peroxide being in the 1:2 to 1:5 (v/w), wherein prior to addition, hydrogen peroxide is cooled at −5 to −20° C. for few hours and the reaction between hydrogen peroxide and lignite being allowed to be carried out at 10° to 15° C. for one hour followed by at a temperature of about 15 to 20° C. for about three hours, after which the same step are repeated a predetermined number of time followed by addition of hydrogen peroxide having concentration of about 5 to 50% to the resultant substance at temperature in the range of 25 to 30° C. in a ratio of 1:1 (v/w) and the resulting material is extracted with water and centrifuged at 5,000 to 10,000 RPM on continuous centrifugation to obtain soluble functionally effective organic molecules from lignite by cleaving with hydrogen peroxide.

In another embodiment of the present invention, the functionally effective organic molecules having molecular weight below 1000 are selective suited for phosphatic fertilizers and/or for foliar application and/or for designing various molecules.

In yet another embodiment of the present invention, the functionally effective organic molecules having molecular weight above 5000 are selective suited for nitrogenous fertilizers and/or for designing various molecules.

In still another embodiment of the present invention, the functionally effective organic molecules having molecular weight below 500 are selective suited for foliar application and/or for seed treatment compositions and/or for fertigation application.

In one more embodiment of the present invention, the functionally effective organic molecules depict characteristic absorbance of peaks at 1600-1750 wave numbers ($cm^{-1}$) when a liquid sample is analyzed by FTIR in calcium fluoride cell accessory in FTIR.

In one further embodiment of the present invention, the functionally effective organic molecules having molecular weight below 1000 possess decontaminating capability of toxic heavy metals including actinides such as uranium and/or proteins.

In a further embodiment of the present invention, the functionally effective organic molecules possess plant growth and yield enhancing nature.

In a further more embodiment of the present invention, the functionally effective organic molecules having molecular weight below 1000 wherein the same have capability to enhance phosphate availability to plants when mixed with phosphate fertilizers thereby by enhancing crop yield.

In one more embodiment of the present invention, the functionally effective organic molecules having molecular weight above 5000 wherein the same have capability to enhance crop yield when mixed with nitrogenous fertilizers by increasing nitrogen use efficiency.

In an embodiment of the present invention, the functionally effective organic molecules when analyzed using solid state NMR confirmed the enhancement of functional groups as shown in figures as the differences in 13-C NMR spectra of lignite with lower molecular weight organic molecules extracted from lignite using hydrogen peroxide or quantified by the relative distribution of carbon intensities along the chemical shift axis indicating a strong reduction of aliphatic groups (0 to 60 ppm) and a sharp increase in aromatic (110 to 165 ppm), carboxylic, amidic or ester (160 to 190 ppm) and carbonyl groups (190 to 220 ppm).

In another embodiment of the present invention, preparation of the functionally effective organic molecules includes selectively synthesizing functionally effective organic molecules with or without extraction with varied reaction conditions.

In yet another embodiment of the present invention, the preparation of the functionally effective organic molecules includes extracting the functionally effective organic molecules having selective molecular weight, which is achieved by optionally performing ultra filtration technique including using selective molecular filters.

DETAILED DESCRIPTION OF THE INVENTION

Now this invention will be described in detail so as to illustrate and explain various salient features of the invention. The detailed description is provided so as to enable a person skilled in the art to clearly understand and reproduce the invention. However, the contents of the same are not to be taken to be construed the detailed description and are intended to be only by the appended claims and their equivalents.

One embodiment of the invention is to provide functionally effective organic molecules production by cleaning lignite with Hydrogen Peroxide. Another embodiment of the present invention relates to a method of production of desired molecular weight functionally effective organic molecules by appropriate reaction with hydrogen peroxide.

This method also involves production of functionally effective organic molecules which are soluble that can be ligated with desired single and/or multiple combinations that have utilities to treat diseases, to design effective nutrients, to prepare organic inorganic inorganic hybrids etc.

In a preferred embodiment, the present invention provides method of producing organic molecules from lignite and said method comprising the following steps:

(a) Micronization of lignite below twenty micron size;
(b) Drying the micronized lignite to remove excess moisture;
(c) Treating the said micronized lignite powder with hydrogen peroxide;
(d) Extracting functionally effective organic molecules after completion of reaction of lignite cleavage with hydrogen peroxide by centrifuge and removal of supernatant; and
(e) Drying the resultant solution with a dryer (if powder form desired).

In another embodiment, powdering of the lignite material was obtained by grinders and micronization of lignite powder is effected by using micronizer to obtain desired practice size in microns.

In one more embodiment, the reaction of lignite with hydrogen peroxide is optimised by variable compositions at variable temperatures for obtaining desired molecular weight functionally effective organic molecules from lignite cleavage.

In another embodiment, the resultant solution obtained by hydrogen peroxide cleavage of lignite is purified by centrifugation.

In another embodiment, the resultant solution is optionally ultrafiltered to obtain desired molecular weight molecules.

Hydrogen peroxide treatment with lignite results in production of small size organic molecules which are soluble in nature.

In an embodiment, 5-25% of hydrogen peroxide was added to micronized lignite at a ratio of 1:2 to 1:5 (v/w) based on lignite quality. Before addition, hydrogen peroxide was cooled at −20° C. for few hours. The reaction was carried at 10° to 15° C. for one hour and later 20° C. for three hours. After this reaction, the same step was repeated twice or thrice or more times depending on the type of the lignite. Later, 50% hydrogen peroxide was directly added to the resultant substance at room temperature i.e. 25 to 30° C. at a ratio of 1:1 (v/w). The resultant material was extracted with water and centrifuged at 5,000 to 10,000 RPM on continuous centrifugation to obtain soluble functionally effective organic molecules from lignite by cleaving with hydrogen peroxide. Intense treatment with hydrogen peroxide with more concentration, time, temperature, dose results with less molecular weight functionally effective organic molecules, whereas, the size of functionally effective organic molecules derivitization depends on the reaction conditions of lignite with hydrogen peroxide.

BRIEF DESCRIPTION OF THE ACCOMPANYING DRAWINGS

In the drawings accompanying the specification,

Now the applicant provides following specific description by way of examples and illustrations of the invention and this should not be construed to limit the scope of the invention in any manner. Where applicable, the invention is described with reference to the drawings.

EXAMPLE 1

Figure 1:
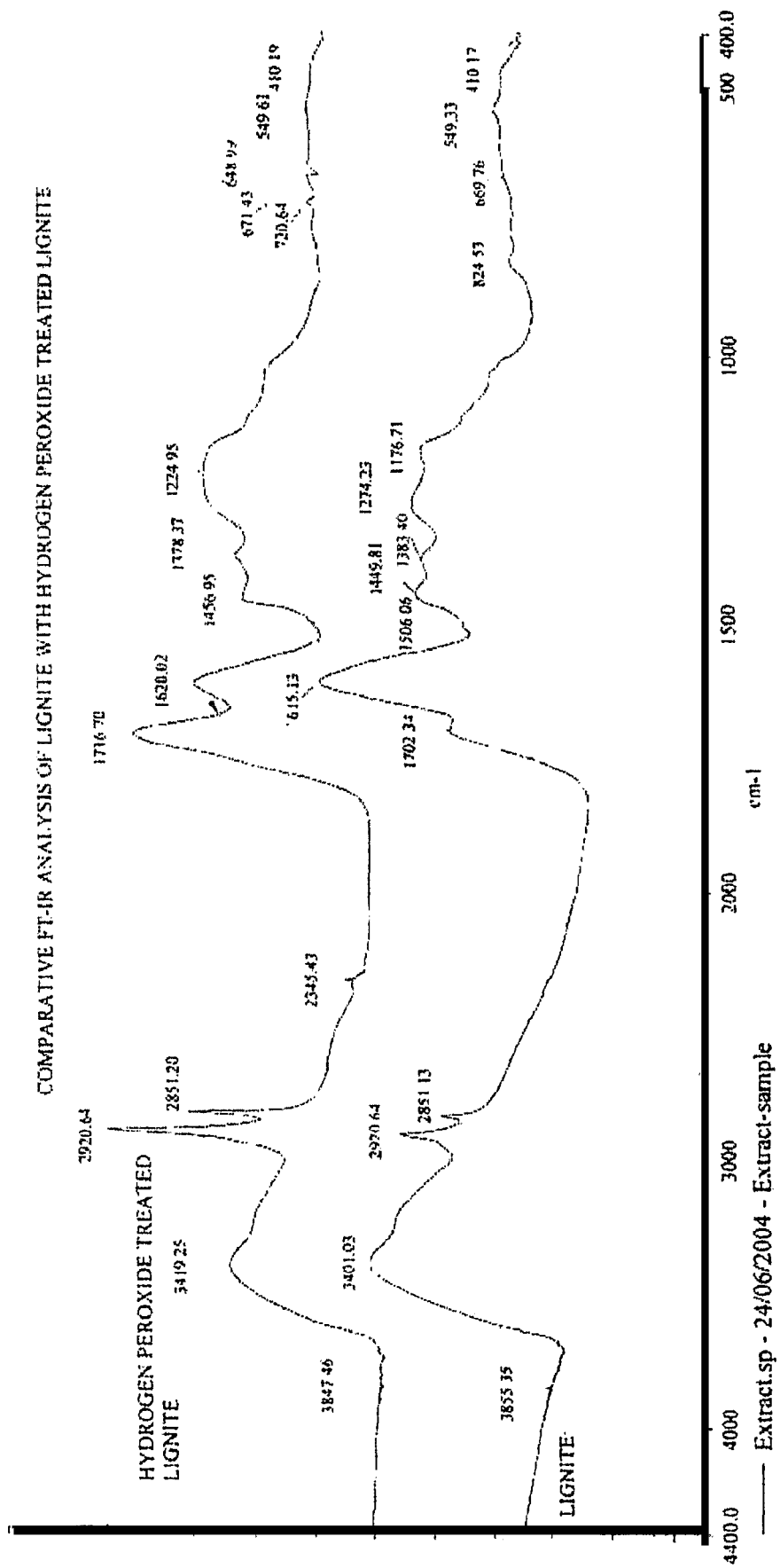
FIG. 1 shows the comparative FTIR analysis of lignite with hydrogen peroxide treated lignite (without extraction).

Process for Preparing Lignite Sample Treated with Hydrogen Peroxide and its Evaluation 10 ml of 50% hydrogen peroxide was added to 25 gms of micronized lignite sample and kept for 12 hours after thorough mixing. This step was repeated two times. As shown in FIG. 1 this lignite sample treated with hydrogen peroxide resulted in enhancement of active constituents as the absorbance intensity of significant increase to 1716.70±10 wave numbers ($cm^{-1}$).

FIG. 1 relates to FTIR analysis of comparative analysis of lignite with hydrogen peroxide treated lignite (without extraction). As shown in FIG. 1, the enhancement of nutritionally active bond was effected by hydrogen peroxide treatment as the absorbance of the peak at 1716±10 was observed compared to 1702±10 in untreated control lignite and these bonds were quantitatively enhanced in treatment comparative to control.

Figure 2:
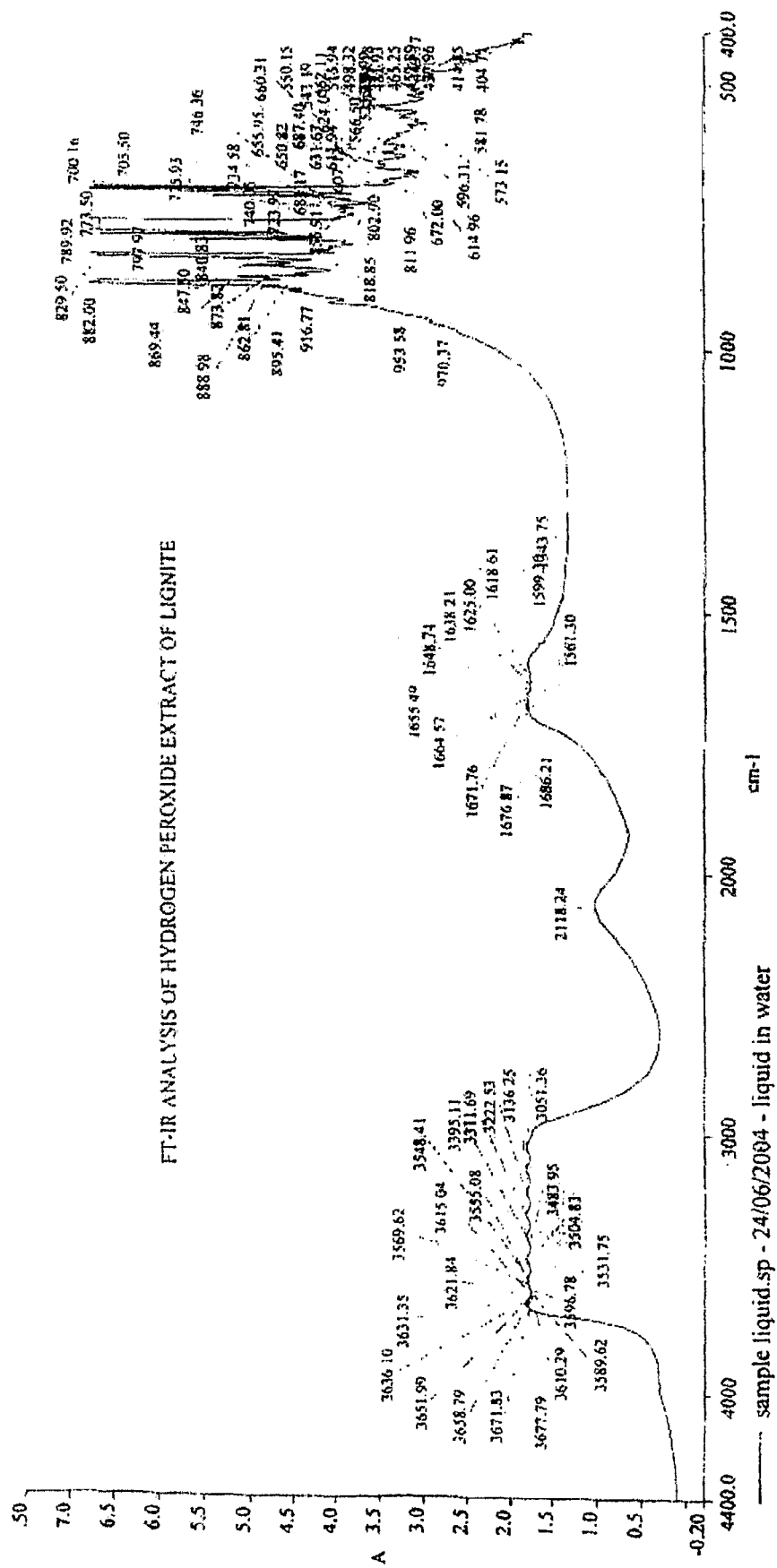
FIG. 2 shows the FTIR analysis of hydrogen peroxide treated lignite without extraction containing large number of lower molecular weight organic molecule.

As shown in FIG. 2 the absorbance of the peaks from 1600 to 1700 were predominantly enhanced. More particularly, the hydrogen peroxide extract of lignite resulted in number of peaks (more than 40) and with characteristic absorbance of peaks at 1686±10, 1676±10, 1671±10, 1664±10, 1655±10, 1648±10, 1638±10, 1625±10, 1618±10, 1599±10, 1561±10 and 1343±10 wave numbers ($cm^{-1}$). Liquid samples were done in calcium fluoride cell accessory in FTIR. Thus FIG. 2 shows the FTIR analysis of hydrogen peroxide treated lignite without extraction containing large number of lower molecular weight organic molecule.

EXAMPLE 2

Figure 3:
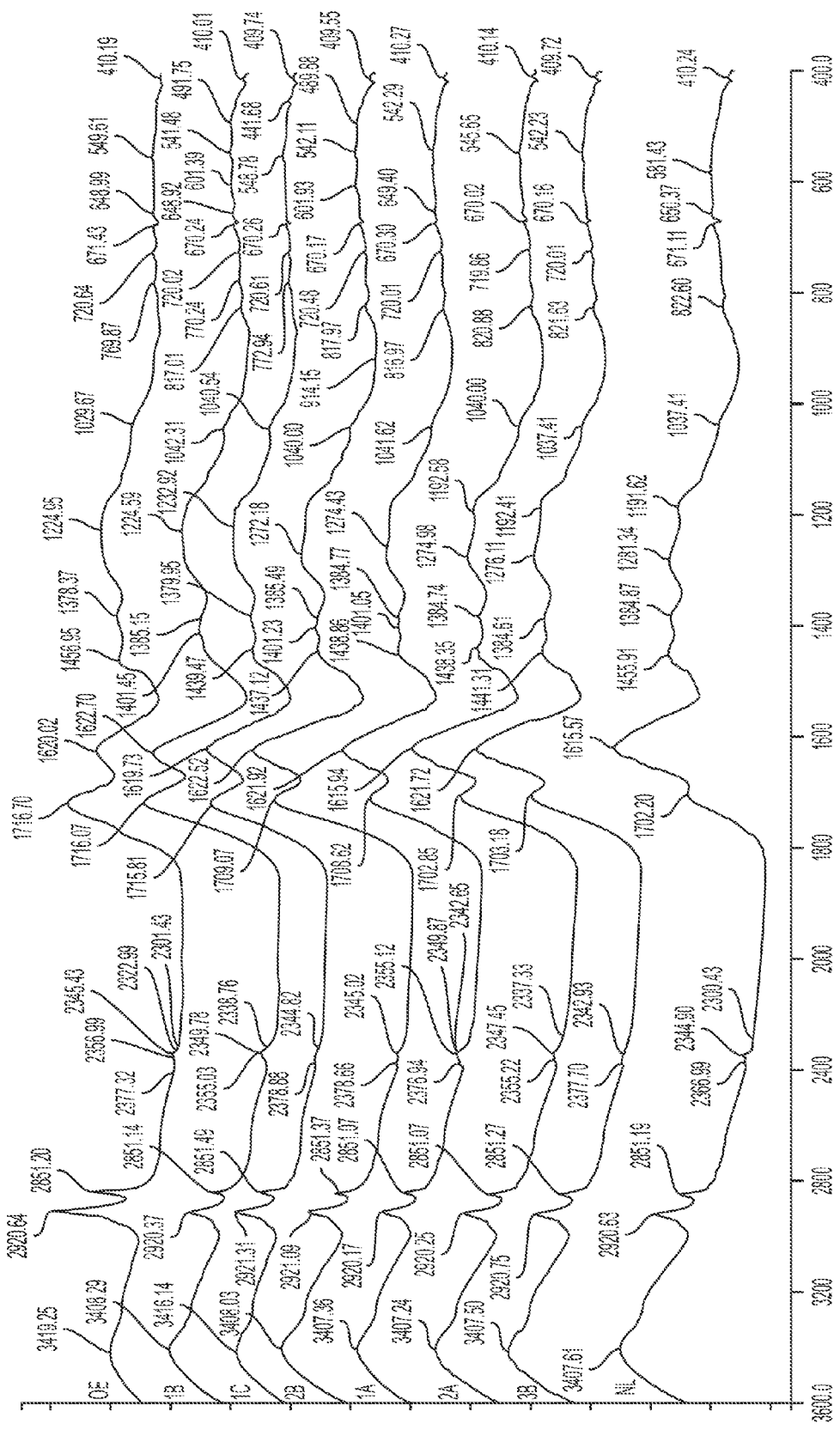
FIG. 3 shows the sequential enhancement of functional groups of lignite with step wise periodical reaction with hydrogen peroxide (without extraction).
Figure 4:
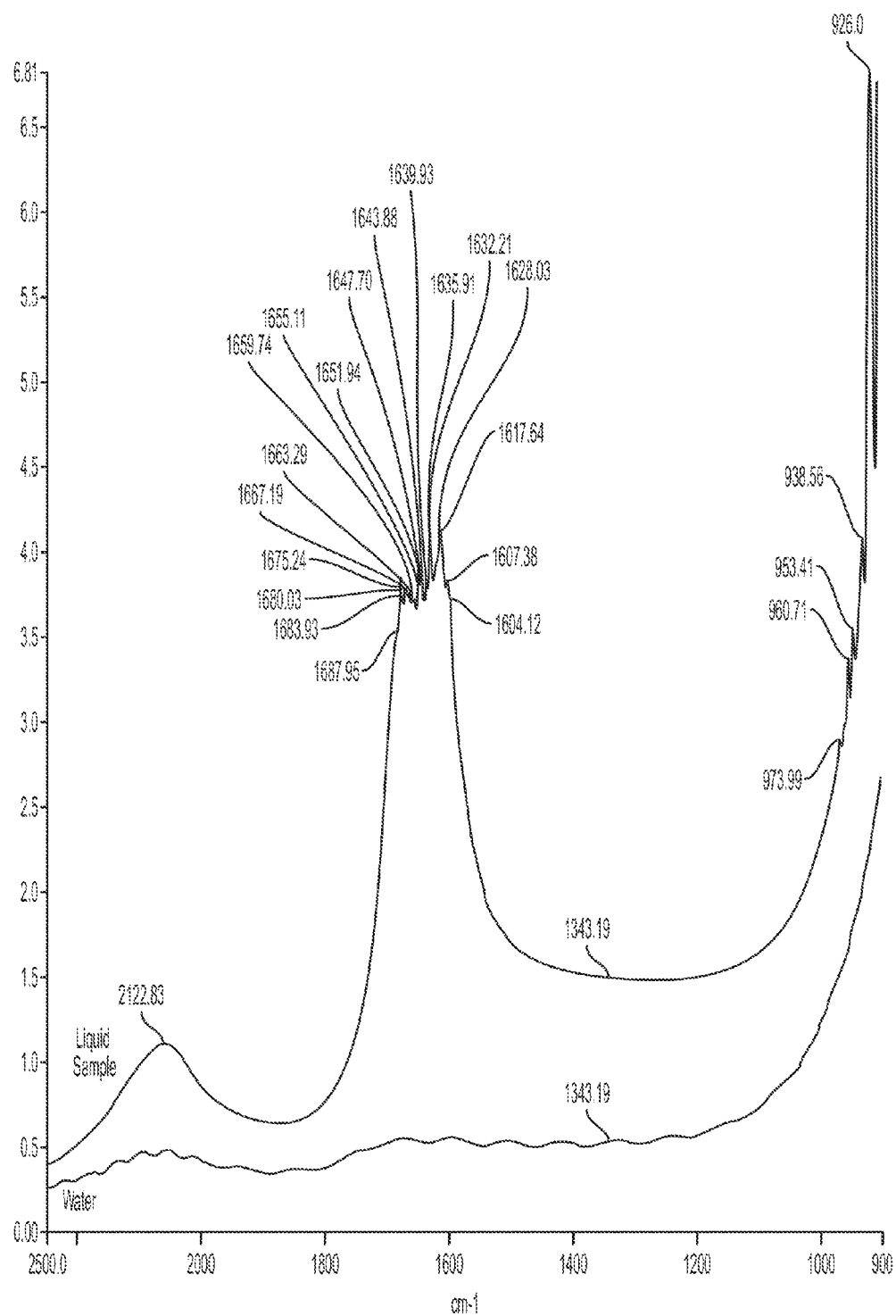
FIG. 4 shows the characteristic absorbance of peaks of organic molecules at 1600 to 1750 wave numbers ($cm^{-1}$) when the liquid samples were analyzed by FTIR in calcium fluoride cell accessory in FTIR after extraction.

Process for Preparing Water Soluble Substance from Lignite by Treatment with Hydrogen Peroxide and its Evaluation 10 ml of 50% hydrogen peroxide was added to 3 gms of micronized lignite sample in a 1 liter beaker after thorough mixing. 1 liter beaker was chosen to avoid loss of material as foaming occurs in this reaction. This resultant solution was kept for 72 hours. 150 ml of distilled water was added to the reaction solution. The resultant solution was centrifuged to remove the non soluble substances at 6,000 rpm for 15 to 20 minutes. The resultant supernatant was collected. As shown in FIG. 3 this hydrogen peroxide extract of lignite has resulted characteristic FTIR showing too many absorbents peaks which is quite different to other treated samples of lignite.

EXAMPLE 3

Ability of the Functionally Effective Organic Molecules in Decontamination of Toxic Heavy Metals 5 ml of 1000 ppm organic molecule extraction having molecular weight below 1000 was added to 500 ml of water containing 20 PPM of uranyl nitrate. After mixing properly, the solution was centrifuged at 5000 RPM and uranium content was estimated by colorimetric method using PAR reagent at 540 nm. Functionally effective organic molecules decontaminated uranium significantly by reducing to PPB levels.

Solid state NMR studies confirmed the enhancement of functional groups such as the difference in $^{13}C$-NMR spectra of lignite (FIG. 5) with lower molecular weight organic molecules (FIG. 6) extracted from lignite using hydrogen peroxide are quantified by the relative distribution of carbon intensities along the chemical shift axis indicating a strong reduction of aliphatic groups (0 to 60 pm) and a sharp increase in aromatic (165 to 110), carboxylic, amidic or ester (190 to 160 ppm) and carbonyl groups (190 to 220 ppm).

The 13C CPMAS NMR Experiments were carried out using DSX-300/AMX-400/DRX-500/AV 500 NMR Spectrometers.

EXAMPLE 4

Ability of the Functionally Effective Organic Molecules in Increasing the Biomass of Plants 3 ml of 1000 ppm of functionally effective organic molecules having (a) molecular weight below 500, (b) molecular weight in the range of 500 to 1000 and (c) molecular weight between 1000 and 5000 was added separately to three Petri plates (each having 16 cm diameter) after placing whatman filter paper. To each of the Petri plates about 100 ml of distilled water was added and about 100 rice seeds were placed in each of the Petri plates. The growth of the rice plants after 9 days was monitored. The details of which are tabulated in Table 1.

TABLE 1

| | Comparative growth enhancing property of lower molecular weight organic molecules | |
|---|---|---|
| Treatment | % enhancement in growth of rice seedlings after 9 days | % enhancement in biomass (dry weight) seedlings after 9 days |
| below 500 mw | 41 | 21 |
| 500-1000 mw | 36 | 14 |
| Above 1000-5000 | 17 | 5 |

EXAMPLE 5

Preparation of Chelated Plant Nutrients Using the Functionally Effective Organic Molecules Chelated plant nutrients were manufactured by reacting plant nutrients with functionally effective organic molecules for enhanced absorption and enhanced utilization efficiency for both foliar and soil application. For example: solution of copper nitrate, zinc nitrate, magnesium nitrate without alcohol were added to functionally effective organic molecules extraction for chelation.

EXAMPLE 6

Preparation of Organic Phosphate Fertilizers Using the Functionally Effective Organic Molecules and Determination of its Ability in Increasing the Yield of Plants Organic phosphate fertilizers were manufactured by addition of functionally effective organic molecules extracted from lignite with phosphate fertilizes (1-10% v/w) such as super phosphate, DAP. These organic phosphate fertilizers were applied on crops like cotton, groundnut, rice, as basal dose enhanced yield upto 10-20% when compared to regular phosphatic fertilizers. Functionally effective organic molecules addition to phosphate fertilizers did enhance the phosphate availability to the plants.

When tested for the size of these functionally effective organic molecules by ultrafiltration using Amicon stirred ultrafiltration cell, Millipore, most of the functionally effective organic molecules are below 1000 molecular weight.

EXAMPLE 7

Ability of the Functionally Effective Organic Molecules in Controlling Pests

The soluble functionally effective organic molecules along with small percentage of hydrogen peroxide with or without alcohols when sprayed on various crop pests controlled the pest population along with enhancement of yield.

EXAMPLE 8

Ability of the Functionally Effective Organic Molecules in Treatment of Plant Diseases These functionally effective organic molecules have potentiality to treat plant and animal viral diseases.

EXAMPLE 9

Ability of the Functionally Effective Organic Molecules for Being Used as Fertigation Products These organic molecules which are soluble can be used as fertigation products.

EXAMPLE 10

Ability of the Functionally Effective Organic Molecules for Sequestering

The soluble functionally effective organic molecules immobilized on various substances sequestered metals, peptides etc. molecules.

EXAMPLE 11

Evaluation of Precipitating Property of the Functionally Effective Organic Molecules The soluble functionally effective organic molecules have the property to precipitate metals, proteins, viruses etc., is solution.

EXAMPLE 12

Evaluation of Binding Property of the Functionally Effective Organic Molecules

The functionally effective organic molecules binding with organic or inorganic polymers, metals yield various materials that have utility in different areas.

EXAMPLE 13

Evaluation of the Utility of any Reside Left after Processing of Lignite

The left over material after removal of soluble functionally effective organic molecules has utility as plant nutrient/fertilizer when blended with various fertilizers enhanced crop yields.

Present innovation explains production of novel functionally effective organic molecules with various utilities from lignite by cleavage with hydrogen peroxide. The results derived from the above experiments gives a scope of using functionally effective organic molecules from lignite for various uses in medicine, agriculture and other applications.

EXAMPLE 14

10 ml of 15% copper nitrate, 10 ml of 15% zinc nitrate, 10 ml of 15% magnesium nitrate, 10 ml of 15% boron, 10 ml of 15% manganese salt, 10 ml of 15% molebdenum salt, 10 ml of 15% calcium, 10 ml of 15% ferric salt, and 10 ml of 15% soluble silicates were singly or combinedly added to 100 gms of structurally modified lignite composition with or without having functionally enhanced organic molecules extracted there-from very slowly drop by drop and stirred well. This resultant mixture was mixed repeatedly over a period of 12 hours). The combination and amount of soluble nutrient salts mixed with micronized lignite powder was varied based on plant specificity and with selective requirements based on time of application and type of application such as soil, foliar or fertigation.

Present invention explains production of novel lignite based plant nutritional products with substantial enhancement of nutritionally active constituents with economical methods by structural modulation along with combining with essential nutrients in order to design products with specificity and selectivity to achieve superior quantity and quality crop products along with sustainable soil health, comprising macro and micro elements required for plant nutrition.

The results derived from the present invention gives a scope of using lignite based plant nutritional products for effective and economic integrated fertilizer management.

This invention has been explained by way of example in terms of plant nutrient and the invention is not restricted to plant alone and the invention would equally apply for other fields such as medicinal.

Figure 5:
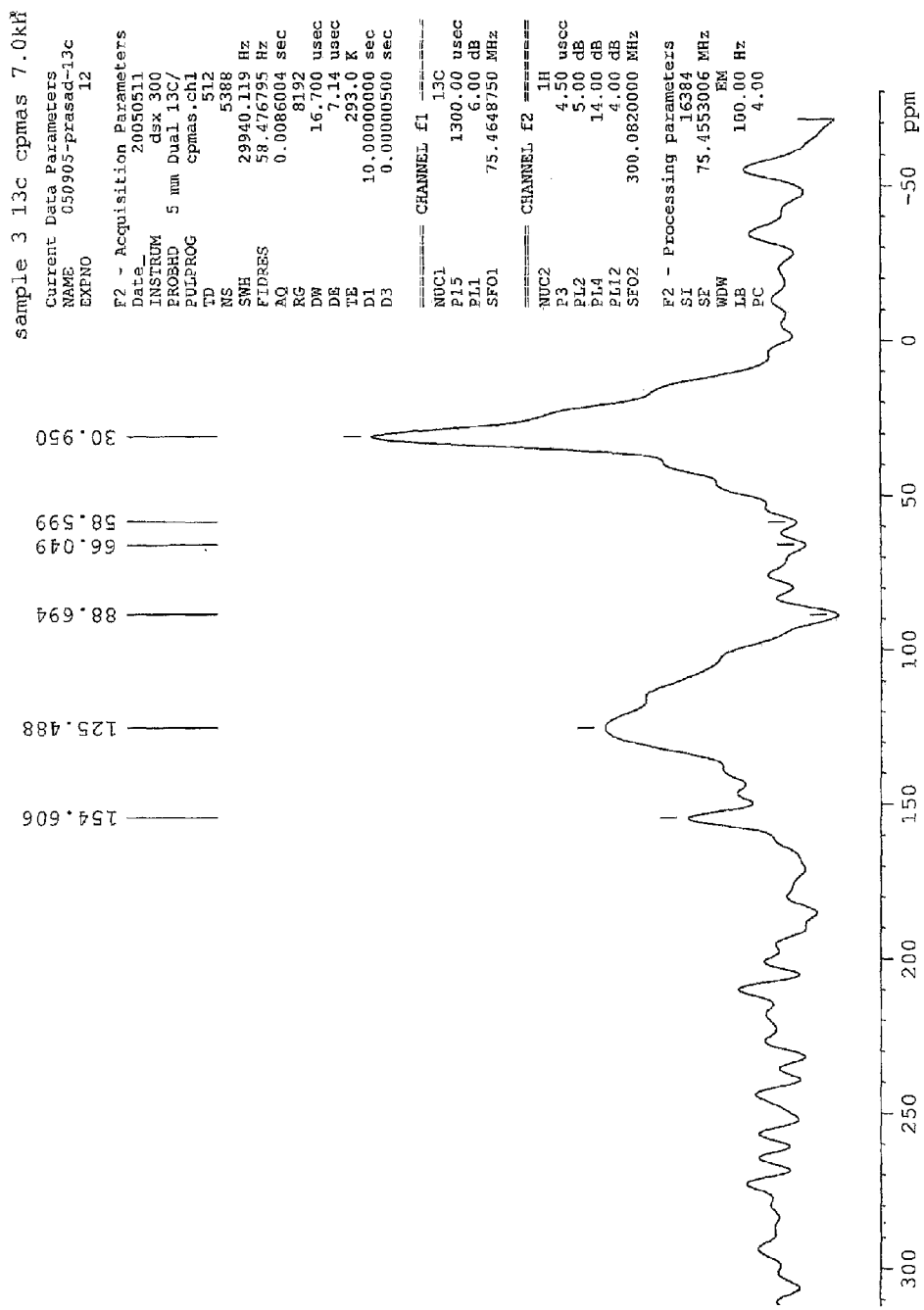
FIG. 5 shows $^{13}C$ NMR spectra of lignite sample.
Figure 6:
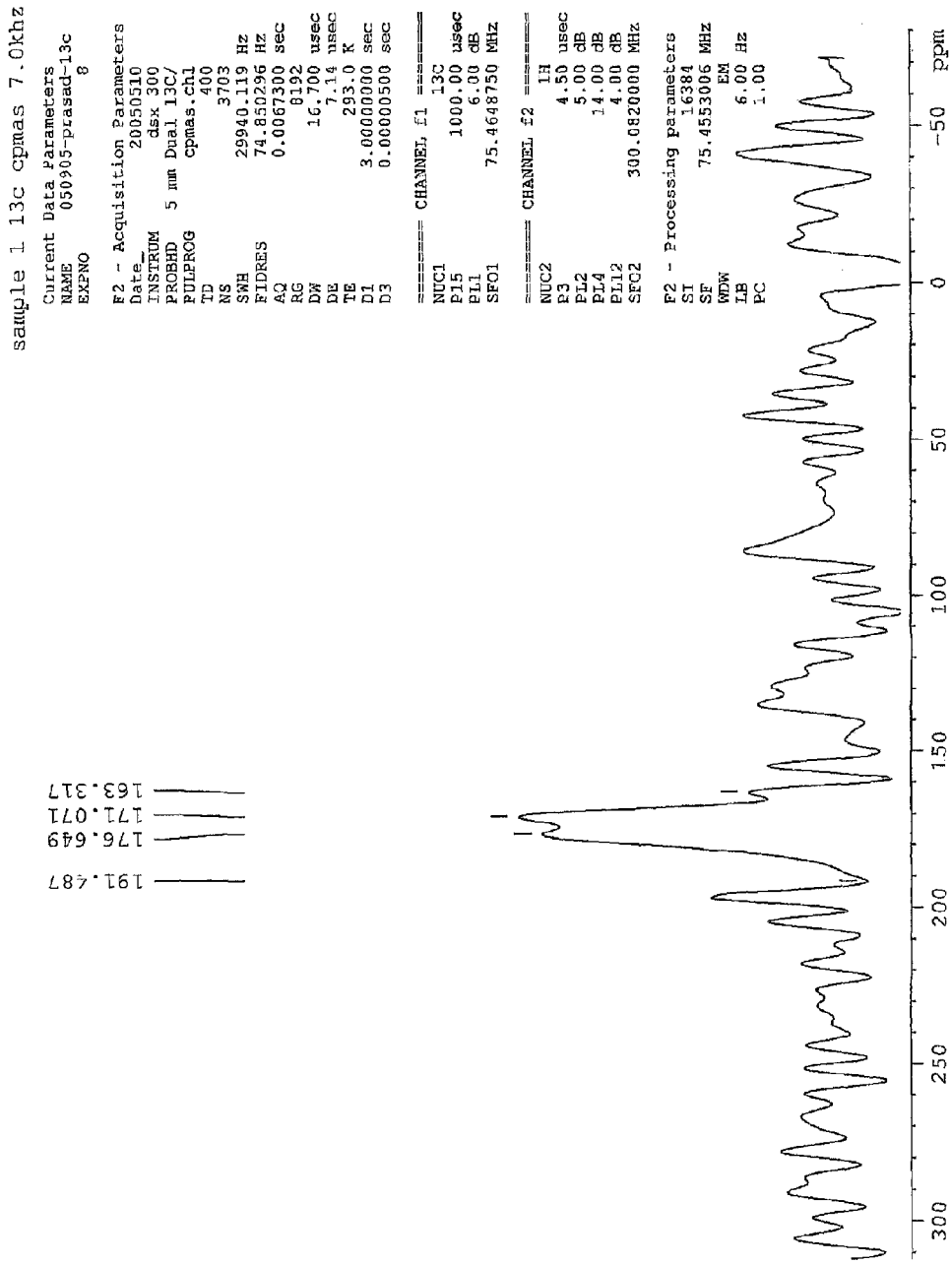
FIG. 6 shows the $^{13}C$ NMR spectra of organic molecules extracted from lignite.
Figure 7:
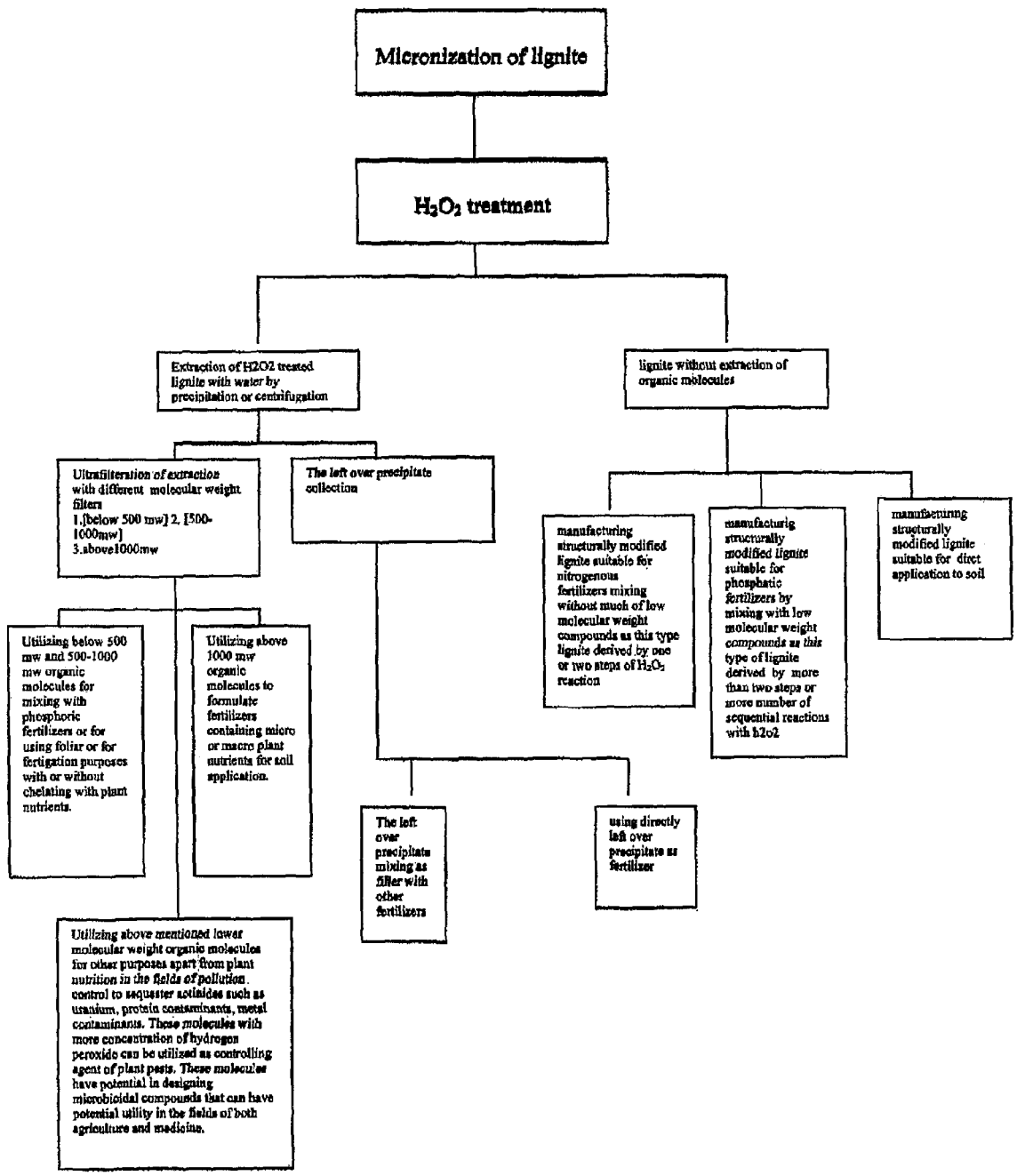
FIG. 7 shows the steps involved in the process for preparing the various products of the present invention, including but not limited to the process for the preparation of functionally effective organic molecules from lignite.

Carbon 13 solid state nuclear magnetic resonance studies on structurally modified lignites confirmed the increase in the functional groups as evidenced in FTIR. 13 CPNMR spectrum of one of the structurally modified lignite has been shown in FIGS. 5 and 6.

The continuous and repeated application of organic substances to the soil sometimes will decline the crop yield and in a detailed study (Schmidt-Rohr et al (2004), PNAS, vol. 101, no. 17, 6351-6354) have indicated that yield declined was attributed to decreased availability of the soil nitrogen which is held mostly to the soil organic matter. In their detailed study, they have indicated that in long term field trials in which initial yield levels of lowland rice approached by yield potential ceiling, yields declined by 35% during 20-30 years of double and triple cropping (Olk etal (1996) Eur. J. Soil Sci. 47, 293-303. Agronomic data indicate that this yield decline resulted primarily from decreased crop uptake of soil nitrogen. They have detected significant amounts of amide nitrogen directly bonded to aromatic ring in humic acid fraction extracted from a continually submerged triple cropped rice soil. Because nitrogen bonded to aromatics is not readily plant available and this observation can explain the yield decline.

So based on above observations and also our own field experimentation experience continuous addition of humic acids or related organic compounds have potential to reduce yields. Especially when lower moleculare weight compounds when added with nitrogenous fertilizers enhanced algal and microbial growth in rice which was observed in our experiments and significant yield reduction was observed. Whereas, these lower molecular weight organic molecules when applied along with phosphatic fertilizer contributed positively to the growth and yield of crops. Higher molecular weight organic molecules when mixed with urea like nitrogenous fertilizer enhanced rice yield significantly which was observed repeatedly in our experiment. Mostly, humic acids, fulvic acids, from natural sources like lignite and leonardite were applied in various forms mostly in the form of alkali extraction. Loading the soils with this organic compounds will decline the crop yields by binding with soil nitrogen thereby declining yields of crops. To avoid this, present invention aims to develop organic acids without deleterious effects by structurally modulating or binding with necessary molecules therefore avoiding the binding of these organic compounds with the nutrient content in the soil avoiding the yield decline in crops.

Regarding phosphatic fertilizers are concerned, it is well known the available phosphorous to the plants is very low out of the total content of phosphorous applied to the soil due to various factors such as immobilization of phosphorous with other cations, poor soil microbial health etc. Soil microbes play a predominant role in nutrient uptake more significantly in phosphate nutrition. Lower molecular weight organic molecules described in this invention have shown significant potential in enhancing soil microbial population that enhancing the phosphate uptake to the plant systems as evidenced by increased biomass along with enhanced crop yield. Whereas the same molecules failed same positive effect when applied with urea like nitrogenous fertilizers as microbes have consumed most of the organic molecules without giving chance to the plant. Whereas above 5000 molecular weight molecules have shown positive performance when mixed with molten urea, later forming into prills, granules or pellets, enhanced significant yield of crops. Functionally transitional metal silicates (PCT/IB2003/002011 dated 15 May, 2003) such as mixture of cupric silicates, zinc silicates, with or without nano-structured or with a mixture of copper, zinc, salts to inhibit urease inhibitors along with structurally modified lignite when mixed with molten urea and/or with other plant nutrients, later forming into prills, granules or pellets, enhanced significant yield of crops.

The functional groups of organic acids present at absorbance (cm−1) at 1750 to 1600 play an important role. Present invention derives more functional groups by structurally modulating lignite with hydrogen peroxide by enhancing the functional groups from 1750 to 1600.

The varied molecular weight organic molecules were obtained by selective periodical reaction of hydrogen peroxide with lignite ranging from (a) below 500, (b) between 500 and 1000, (c) between 1000 and 5000 and (d) a combination thereof and along with enhancing functional groups from 1750 to 1600 IR absorbance peaks and with or without extraction from lignite.

The soluble organic molecules derived by way of extraction was ultrafiltered to obtain desirable molecular weights with selective molecular filters. Now this invention describes the selective manufacturing process of selective molecular weight organic molecules from lignite with or without extractions.

Lignite was added with water in a ratio of 1:1 to 1:3 (w/v). Later cooled hydrogen peroxide (at −5° C. to −20° C.) was added to lignite with water. After thorough mixing, the reaction temperature was enhanced carefully in a step wise periodical manner and at 15° C.+/−5° C. the reaction was carried out from 30 minutes to 5 hours depending upon the lignite quality. Later, based on requirement, periodical addition of 10% to 50% hydrogen peroxide was done to achieve required number of functional groups along with desired molecular weight organic molecules with or without extraction from lignite.

For example one of the methods of deriving varied molecular weight organic molecules from lignite with or without extraction is described. Lignite was added with water in a ratio of 1:2 (w/v). Later, 5 to 15% hydrogen peroxide cooled at −20° C. was added to the lignite containing water and temperature was enhanced carefully to 10° C. and later to 15° C. The reaction later was carried at 18° C. for 30 minutes. The resultant product is more suitable for mixing with nitrogenous fertilizers like urea as the derived lignite contains major amount of organic acids above 5000 molecular weight. Depending upon lignite quality the yield and molecular weight distribution varies and with suitable reaction conditions more functional groups can be enhanced with or without cleavage to certain extent.

For example one of the methods of deriving varied molecular weight organic molecules from lignite with or without extraction is described. Lignite was added with water in a ratio of 1:2 (w/v). Later, 15 to 35% hydrogen peroxide cooled at −20° C. was added to the lignite containing water and temperature was enhanced carefully to 10° C. and later to 15° C. The reaction later was carried at 18° C. for 5 hours. After that water was added to lignite and soluble organic acids were extracted yielding majorly between 1000 to 2000 more than 60%.

For example one of the methods of deriving varied molecular weight organic molecules from lignite with or without extraction is described. Lignite was added with water in a ratio of 1:2 (w/v). Later, 25 to 35% hydrogen peroxide cooled at −20° C. was added to the lignite containing water and temperature was enhanced carefully to 10° C. and later to 15° C. The reaction later was carried at 18° C. for 5 hours. After that periodical addition of 50% hydrogen peroxide was added and this reaction was at least repeated three times. Later, the soluble organic acids were extracted and these extracted organic acids are having majorly a molecular weight below 500 (above 70%). These derived organic molecules are more suitable to manufacture phosphatic fertilizers or for foliar or fertigation applications with or without chelation with other plant nutrients, or for treating seeds or seedlings and also suitable for designing novel pesticides and medicines.

These above reactions without extraction of organic acids from lignite resulted in various types of lignite for different purposes such as suitable to mix with phosphatic fertilizers and suitable lignite to mix with urea like nitrogenous fertilizers.

This invention also describes manufacturing of lignite type organic fertilizers without damaging effect of binding with soil nitrogen therefore declining crop yield (Ref.: Nitrogen-bonded aromatics in soil organic matter and their implications for a yield decline in intensive rice cropping—Schmidt-Rohr et al, PNAS, 2004, vol. 101, no. 17, 6351-6354). Continuous application of organic substances can lead to decline in crop yields due to binding nature of these molecules with plant nutrients. Most of the lignite containing substances are applied with extraction of potassium. Accumulation of organic substances can harm reversely the soil health effecting negatively crop yields. Selectively adding suitable substances with suitable functional groups along with cleaved organic molecules with or without extraction along with plant nutrients offers a viable long term method of effective plant nutrition as lower molecular weight organic molecules more suitable to mix with phosphatic fertilizers whereas higher molecular weight organic molecules are more beneficial to mix with nitrogenous fertilizers. Reacting the organic molecules with required substances such as urea (0.10 to 5% w/w) prevents the binding of organic molecules with nitrogenous molecules therefore without declining the crop yield which was evidenced with extensive field experimentation mainly on crops like cotton and paddy.

As evidenced from FIG. 3 continuous enhancement of functional groups in lignite was achieved by sequential or step wise periodical reaction with hydrogen peroxide as the absorption peaks from 1600 to 1750 enhancement significantly and this method gives an opportunity to add functional groups for desired purpose with quantified functional groups or molecules.

As opposed to the teachings of U.S. Pat. Nos. 5,034,045 and 5,026,416 (granted to William Alexander, which describes the treating of the alkali metal with leonardite. The derivative of the invention primarily derived by reacting with potassium hydroxide with small amount of addition of hydrogen peroxide in alkaline conditions, so that as explained in these patents to achieve the full advantage of the present condition, the humic acid bearing leonardite ore is treated with potassium hydroxide, by this method the oxidized sites of humic acid are saturated with readily ion-exchangeable non volatile alkali metal ions, such as potassium ions and thus to attain the maximum solubility, the pH to be increased to the range of approximately 11, thereby the total reaction condition is alkaline deriving an alkali metal salt mainly aiming for cation exchange capacity), the present invention is carried out at acidic condition; without alkali the derivative is not a salt.

In the present invention, the reaction does not involve the saturation of lignite with potassium or any other alkali. The present invention is aimed to derive organic molecules from lignite by hydrogen peroxide reaction at acidic conditions suitable to use in any form either by foliar, or for addition to any other substances such fertilizers and or pesticides. Further more the present invention also aims to claim or achieve desirable quality of lignite by cleaving and or incorporating or enhancing more reactive sites or bonds, either by keeping intact with lignite by sequential reaction with hydrogen peroxide by structural modification of the lignite is described in the invention as shown in FTIR and $^{13}$C NMR Spectrum. Present invention not only aims to develop molecules that have more functional freedom in structural and functional aspects of biological reactions as these molecules are not filled or saturated with alkali such as potassium. This present invention also describes the production of lower molecular weight, organic molecules from lignite that are useful for both foliar with effective chelation and for formulating with many other fertilizers such as DAP, super phosphate etc, and also suitable to derive various products suitable in fields of medicine and agriculture. These organic molecules derived more feasibilities to utilize them in biosystems than humic acids saturated with alkali.

The present invention also describes to produce lower molecular weight organic acids from lignite even below 500 molecular weight and/or deriving selective molecular weight molecules such as below 500, 500 to 1000 or above 1000 to 2000 or 2000 and above, but below 5000 mw suitable for required purposes. Detailed field and pot culture experiments from last 5 years indicates the greater advantage of lower molecular weight than others in enhancing yield of crops like cotton and paddy.

Present invention describes the derivitization and structural modification with sequential addition of hydrogen peroxide as shown in FIG. 3 with sequential enhancement of reactive bonds in lignite. The reactive bonds were enhanced and the desirable quality of lignite can be taken for different purposes such as less reacted lignite suitable for mixing with urea type nitrogen fertilizers more reacted and more sequentially reacted lignite suitable to mix in phosphoric acid or phosphate fertilizers. FTIR of low molecular weight organic molecules derived from lignite by hydrogen peroxide extraction in liquid form shown (FIG. 2) the characteristic FTIR absorbance peaks.

| Performance of Plant Nutrients with Structurally Modified Lignite | | | |
|---|---|---|---|
| Product Tested | Type of Experimentation | Crop Tested | Result |
| Urea mixed Structurally Modified Lignite (treated with $H_2O_2$, above 5000 mw) 2-10% (w/w) | Pot culture experiments. Field experiments. | Rice Cotton | 5-25% yield enhanced when tested on different location with soil conditions variability. |
| Phosphatic Fertilizers (Single, Super Phosphate, DAP) mixed with $H_2O_2$ treated Lignite below 1000 mw) (2-20% w/w) | Pot culture experiments. Field experiments. | Rice Cotton | 10-20% yield enhanced when tested on different location with soil conditions variability. |
| Potash (Muriate of Potash) mixed with left over Lignite after processing (2-20% w/w) | Pot culture experiments. Field experiments. | Rice Cotton | 10-15% yield enhanced when tested on different location with soil conditions variability. |

I claim:

1. A process for preparing structurally modified lignite composition comprising the steps of
   (a) adding lignite with water in a ratio in the range of 1:2 to 1:5 (w/v),
   (b) cooling hydrogen peroxide to a temperature of about adding −20° C. and adding the same to the lignite containing water,
   (c) increasing the temperature of the reaction mixture thus obtained to a value in the range of 5 to 20° C. in one or more steps and allowing the reaction to proceed at a temperature in the range of 15 to 20° C. for a time period in the range of 3 to 7 hours and
   (d) adding to the reaction mixture thus obtained sequentially and periodically hydrogen peroxide having a concentration greater than the concentration of the hydrogen peroxide used in step (b) to obtain structurally modified lignite composition containing substantial amount of organic molecules whose molecular weight is below 500.

2. The process as claimed in claim 1, wherein the concentration of hydrogen peroxide used is in the steps (b) and (d) is in the range of 25 to 50%.

* * * * *